US009633387B2

(12) United States Patent
Yuan (10) Patent No.: US 9,633,387 B2
(45) Date of Patent: Apr. 25, 2017

(54) TEMPERATURE-BASED DETERMINATION OF BUSINESS OBJECTS

(71) Applicant: Alibaba Group Holding Limited, George Town (KY)

(72) Inventor: Huaibin Yuan, Hangzhou (CN)

(73) Assignee: Alibaba Group Holding Limited (KY)

( * ) Notice: Subject to any disclaimer, the term of this patent is extended or adjusted under 35 U.S.C. 154(b) by 715 days.

(21) Appl. No.: 13/865,663

(22) Filed: Apr. 18, 2013

(65) Prior Publication Data
US 2013/0290130 A1      Oct. 31, 2013

(30) Foreign Application Priority Data

Apr. 25, 2012   (CN) .......................... 2012 1 0125081

(51) Int. Cl.
*G06Q 30/06*         (2012.01)
*G06Q 30/02*         (2012.01)

(52) U.S. Cl.
CPC ..... *G06Q 30/0631* (2013.01); *G06Q 30/0252* (2013.01); *G06Q 30/0261* (2013.01); *G06Q 30/06* (2013.01); *G06Q 30/0601* (2013.01)

(58) Field of Classification Search
CPC . G06Q 30/06; G06Q 30/0601; G06Q 30/0631
USPC ............................................. 705/26.1, 26.7
See application file for complete search history.

(56) References Cited

U.S. PATENT DOCUMENTS

| 8,165,791 | B2 * | 4/2012 | Yamada | ................... | B60L 1/003 |
| | | | | | 701/123 |
| 8,386,514 | B2 | 2/2013 | Cheng et al. | | |
| 8,396,759 | B2 * | 3/2013 | Mehta | ................ | G06Q 30/0282 |
| | | | | | 455/456.3 |
| 8,437,778 | B1 | 5/2013 | Ortega et al. | | |
| 2005/0091118 | A1 | 4/2005 | Fano | | |
| 2006/0206273 | A1 * | 9/2006 | Reichel | ................ | F24F 11/0017 |
| | | | | | 702/27 |
| 2007/0136234 | A1 | 6/2007 | Levin et al. | | |
| 2007/0177668 | A1 * | 8/2007 | Park | ..................... | H04N 19/176 |
| | | | | | 375/240.12 |

(Continued)

FOREIGN PATENT DOCUMENTS

| CN | 102323926 | 1/2012 |
| JP | 2002056299 | 2/2002 |

(Continued)

OTHER PUBLICATIONS

Lane et al, "Hapori: Context-based Local Search for Mobile Phones using Community Behavioral Modeling and Similarity", Ubicomp 2010, retrieved from the internet, retrieved on [Jun. 11, 2013] <URL: http://www.cs.dartmouth.edu/~campbell/papers/hapori.pdf> entire document.

*Primary Examiner* — Nicholas D Rosen
(74) *Attorney, Agent, or Firm* — Van Pelt, Yi & James LLP (57) ABSTRACT

Determining business objects is disclosed, including: receiving an access request from a client device; determining a set of relevant business objects based at least in part on information included in the access request; determining a location associated with the client device; determining temperature information associated with the location; and selecting at least a subset of business objects from the set of relevant business objects based at least in part on the temperature information.

17 Claims, 5 Drawing Sheets

(56) References Cited

U.S. PATENT DOCUMENTS

| | | |
|---|---|---|
| 2008/0004967 A1 | 1/2008 | Gillen |
| 2008/0090591 A1 | 4/2008 | Miller et al. |
| 2008/0160956 A1* | 7/2008 | Jackson ............ H04M 3/02 455/406 |
| 2009/0005076 A1 | 1/2009 | Forstall et al. |
| 2009/0254824 A1* | 10/2009 | Singh ............ G01C 21/3679 715/716 |
| 2011/0010245 A1* | 1/2011 | Priebatsch ............ G06Q 30/02 705/14.58 |
| 2011/0047454 A1* | 2/2011 | Sugimoto ............ G06F 17/211 715/243 |
| 2011/0105150 A1* | 5/2011 | Moon ............ H04W 4/001 455/456.3 |
| 2011/0320307 A1* | 12/2011 | Mehta ............ G06Q 30/0282 705/26.7 |
| 2012/0011568 A1* | 1/2012 | Tahan ............ G06F 3/0481 726/4 |
| 2012/0022775 A1* | 1/2012 | Yamada ............ B60L 1/003 701/123 |
| 2012/0036014 A1* | 2/2012 | Sunkada ............ G06Q 30/02 705/14.54 |
| 2012/0041830 A1* | 2/2012 | Rothschild ............ G06F 21/10 705/26.1 |
| 2012/0054009 A1* | 3/2012 | Furman ............ G06Q 30/0252 705/14.5 |
| 2012/0072287 A1* | 3/2012 | Crane ............ G06Q 30/0261 705/14.58 |
| 2012/0077470 A1 | 3/2012 | Kim et al. |
| 2012/0095877 A1* | 4/2012 | Ciudad ............ G06F 21/105 705/27.1 |
| 2012/0098977 A1* | 4/2012 | Striemer ............ G06Q 30/06 348/207.1 |
| 2012/0116550 A1* | 5/2012 | Hoffman ............ A63B 71/0622 700/91 |
| 2012/0123867 A1* | 5/2012 | Hannan ............ G06Q 30/0261 705/14.58 |
| 2013/0151656 A1* | 6/2013 | Bourret ............ G06Q 30/0252 709/217 |

FOREIGN PATENT DOCUMENTS

| | | |
|---|---|---|
| JP | 2005151322 | 6/2005 |
| JP | 2007122203 | 5/2007 |
| JP | 2010073170 | 4/2010 |
| JP | 2010146656 | 7/2010 |
| WO | 2012032137 A1 | 3/2012 |

* cited by examiner

TEMPERATURE-BASED DETERMINATION OF BUSINESS OBJECTS

CROSS REFERENCE TO OTHER APPLICATIONS

This application claims priority to People's Republic of China Patent Application No. 201210125081.9 entitled A BUSINESS OBJECT DETERMINING METHOD AND DETERMINING DEVICE, filed Apr. 25, 2012 which is incorporated herein by reference for all purposes.

FIELD OF INVENTION

The present application relates to the field of Internet search technology. In particular, it relates to techniques of searching for relevant business objects.

BACKGROUND OF THE INVENTION

The Internet has become a basic vehicle for business services. Business services that are realized through the Internet are generally referred to as Internet business services. There are currently many types of Internet business services, which are primarily realized through deployment on various web servers. For example, businesses can conduct transactions over websites. Conventionally at an e-commerce website, a seller user may submit descriptive information associated with a business object that the user is selling over the website. The descriptive information submitted for the business object is then displayed at the business object's webpage at the e-commerce website. For example, a business object may be a physical product or a non-physical product (e.g., a set of information). For example, if the business object is a physical product, the descriptive information associated with the business object may include pictures of the product, the name of the product, the use of the product, and the price of the product. If the business object is a non-physical product such as information, the descriptive information associated with the business object may include a summary of the information or key phrases.

In the process of searching for business objects, users may send access requests (e.g., search queries) to web servers by using client devices. In response to receiving an access request, a web server may return a webpage with a list of relevant business objects. For example, an access request may include one or more keywords and the returned relevant business objects may be associated with descriptive information that match the keywords of the access request. To view the webpage and descriptive information associated with a particular business object, the user may select a link associated with the business object.

However, not all business objects that are found to match the information (e.g., keywords) included in an access request are necessarily of interest to the searching user. For example, some of the types of business objects that are returned may be more suited for use during specific periods of time. For example, if the relevant business objects belong to the apparel category, some of the business objects may be suited for winter use, such as down coats or heavy fabric clothing. Other business objects may be more suited for summer use, such as short skirts and blouses. Thus, it is very possible that at least some of the returned business objects are not of interest of the user. Transmitting of information associated with such business objects that do not match the actual needs of users is a waste of network transmission resources. In addition, it may create a less desirable user experience for users to continuously browse through business objects that they have no interest in.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of determining business objects are described herein. An access request sent from a client device is received. Business objects that are relevant to the access request are determined. In various embodiments, a location associated with the client device is determined. In various embodiments, temperature information associated with the location associated with the client device is determined. An attribute related to an applicable temperature range is stored for each business object. For example, the temperature range may represent a range of temperatures in which the business object is best used. For example, a parka jacket may be associated with a range of low temperatures because it is best suited for cold weather. The temperature range attributes corresponding to the relevant business objects are compared against the determined temperature information associated with the location of the client device and the subset of relevant business objects whose temperature range attributes match the determined temperature information are included among search results that are returned to the client device. Any relevant business objects whose temperature range attributes that do not match the determined temperature information is not included among search results that are returned to the client device. As a result, certain business objects may be filtered out from the search results based on their attributes associated with applicable temperatures.

Figure 1:
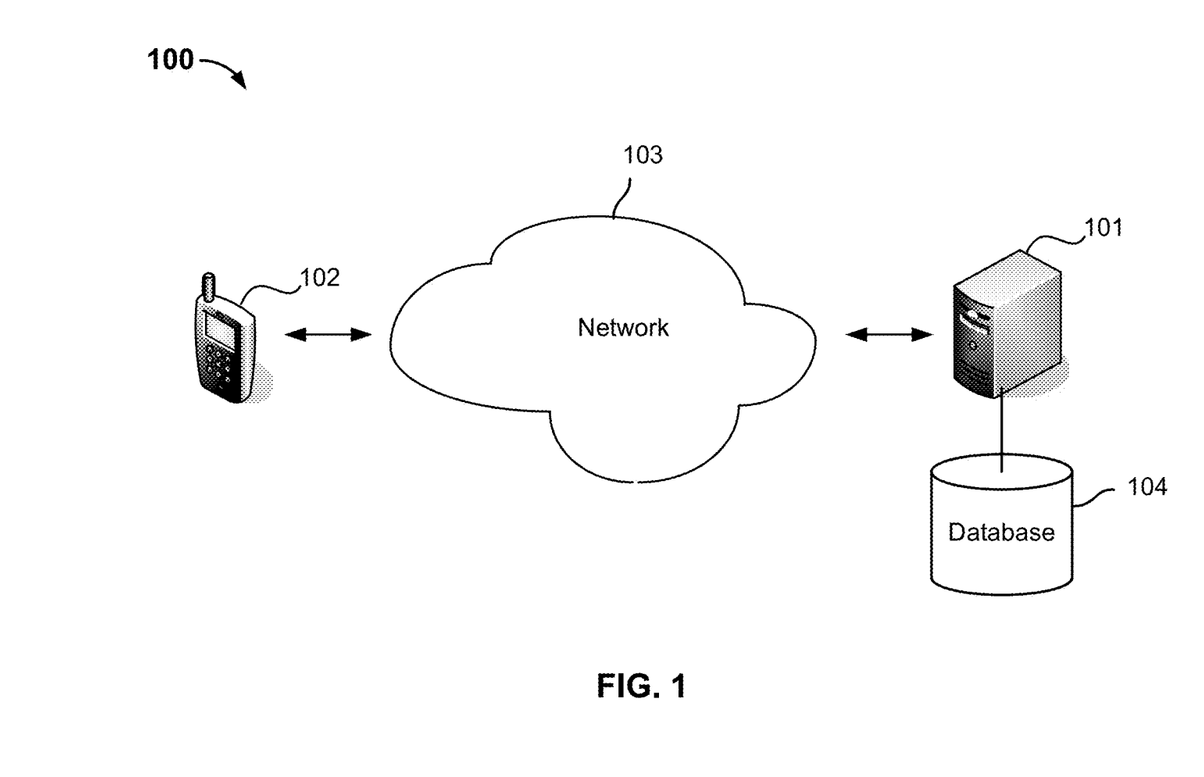
FIG. 1 is a diagram showing an embodiment of a system for determining business objects.

FIG. 1 is a diagram showing an embodiment of a system for determining business objects. In the example, system 100 includes client device 102, network 103, server 101, and database 104. Network 103 may include high-speed data networks and/or telecommunications networks.

While client device 102 is shown to be a cell phone, other examples of client device 102 includes a smart phone, a mobile device, a tablet device, a laptop computer, a desktop computer, and any other computing device. Client device 102 may communicate with server 101 over network 103. In various embodiments, a web browser application is installed at client device 102. A user may use the web browser application to browse a website such as a website supported by server 101. For example, the website is an electronic commerce (e-commerce) website and the user wishes to search for business objects to potentially purchase. The user may submit an access request at the website. An access request may include, for example, a search query that includes one or more keywords.

Server 101 is configured to receive the access request from client device 102. Server 101 is configured to determine a set of relevant business objects (stored at a database such as database 104) for the access request. For example, at database 104, each business object is stored with a set of descriptive information submitted by the seller user that is selling that business object. Then, those business objects whose set of descriptive information matches the keywords of the access request are included in the set of relevant business objects. Matching by keywords is only one example technique of determining relevancy and other techniques of determining relevant business objects may be used as well. In some embodiments, the set of descriptive information and/or another set of metadata stored for each business object at a database such a database 104 include a temperature range attribute. In various embodiments, the temperature range attribute associated with a business object describes the range of temperatures in which the business object is best used. In some embodiments, the value of the temperature range attribute of a business object is also submitted by the seller user.

Server 101 is configured to determine a location associated with client device 102. Server 101 is further configured to determine and/or receive temperature information associated with the location of client device 102. Server 101 is configured to compare the temperature range attributes corresponding to the set of relevant business objects to the determined temperature information associated with the location of client device 102 and return at least a subset of the set of relevant business objects whose corresponding temperature range attributes match the determined temperature information.

Figure 2:
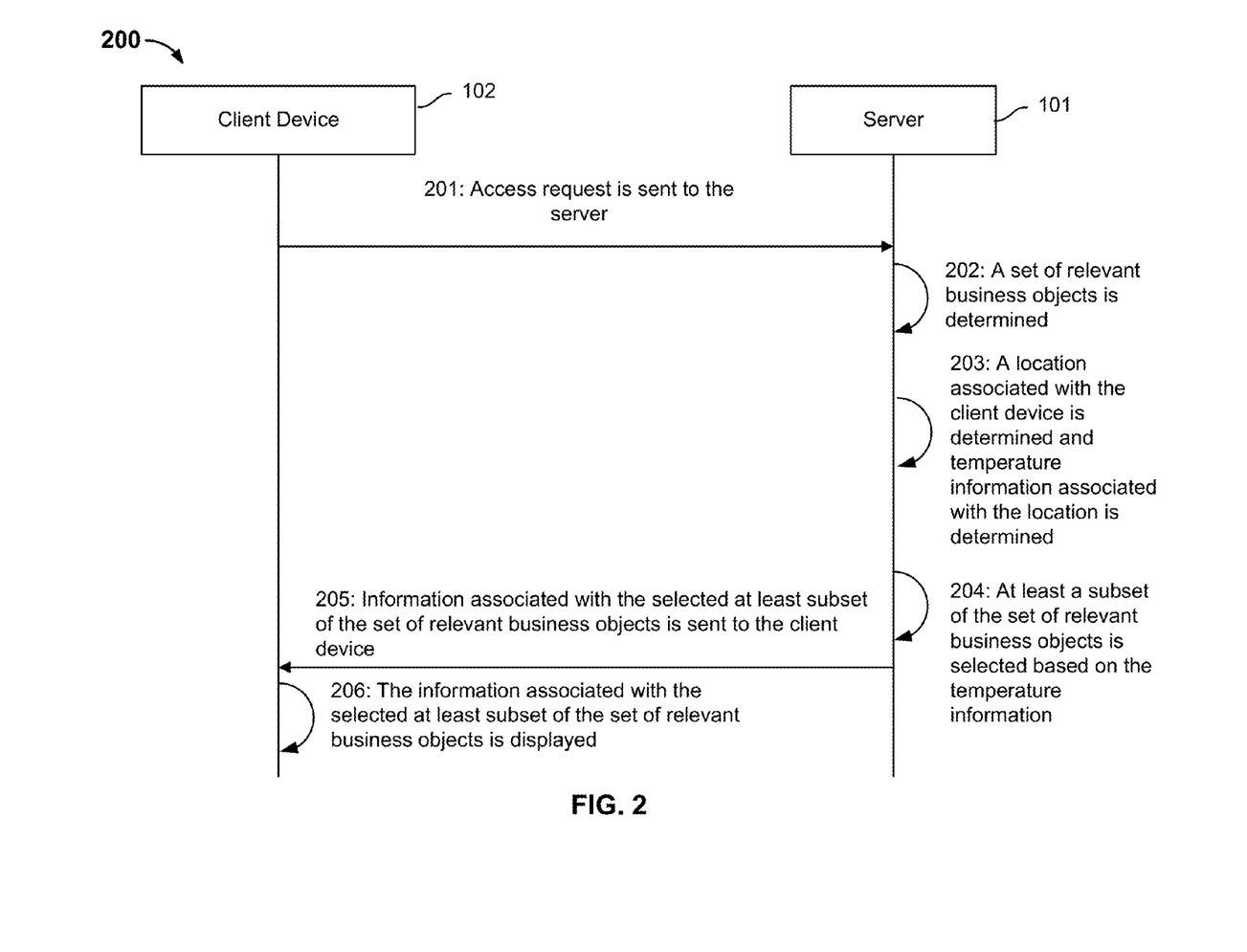
FIG. 2 is a diagram showing an embodiment of a process for determining business objects.

FIG. 2 is a diagram showing an embodiment of a process for determining business objects. In some embodiments, process 200 is implemented at a system such as system 100 of FIG. 1. In the example, process 200 is implemented between a client device such as client device 102 and a server such as server 101 of system 100 of FIG. 1.

At 201, an access request is sent from a client device to a server. For example, a user may visit a website hosted by the server using the web browser application installed on client device 102. The user may submit an access request through a search engine associated with the website. For example, the access request may include one or more keywords that describe the user's desired business object.

At 202, a set of relevant business objects is determined by the server based at least in part on information included in the access request. In some embodiments, the access request includes one or more keywords that the server can use to match against stored business objects. For example, those business objects whose descriptive information and/or other metadata that match the one or more keywords of the access request are included in the set of relevant business objects. Keywords are only an example of the type of information that can be included in an access request and used to determine relevant business objects and other types of information may be included in the access request and/or used to determine relevant business objects as well.

At 203, a location associated with the client device is determined and temperature information associated with the location is determined by the server. In some embodiments, 202 may be performed prior to 203, 202 may be performed after 203, and/or 202 and 203 may be performed at least partially in parallel.

There are various ways to obtain a location associated with a client device. In a first example of determining the location associated with the client device, an IP address associated with the client device that is included in the access request and looked up in database of IP addresses and corresponding locations. For example, the database may include ranges of IP addresses and corresponding locations at various granularities (e.g., IP address X through Y is associated with San Francisco, Calif., United States of America). The IP address of the access request can be compared against the IP address ranges included in the database and for a matching IP address range, a corresponding location (e.g., at the most specific level) can be determined as the location associated with the client device. In a second example of determining the location associated with the client device, the server may send data associated with prompting the user using the client device to submit location information. For example, the server may send instructions to the client device that cause the client device to display a prompt at a user interface for the user to input his or her current location. In a third example of determining the location associated with the client device, a previously stored shipping address associated with the user using the client device may be obtained and the location included in the shipping address may be determined as the location of the client device. For example, the identification of the user associated with the client device may be included in the access request. In a fourth example of determining the location associated with the client device, the client device may be queried through a location service interface. For example, the client device may have a location determination function, which may include an interface that can be queried for the current location of the client device.

Examples of the location of the client device may comprise a city, province, state, geographic coordinates, and/or a zip code.

In some embodiments, the server determines temperature information corresponding to the location of the client device based on stored information such as, for example, the average temperature of the current month for that location. In some embodiments, the server is configured to query a third party server (e.g., a weather service) associated with determining weather and/or temperature information. For example, the server can submit a communication with the location information of the client device to the third party server and the third party server may return a communication that includes a current weather forecast or historical weather records, including a single temperature or a range of temperatures, for that location. In some embodiments, the determined temperature information associated with the location of the client device may include a single temperature value or a range of temperatures. In some embodiments, the determined temperature information may include time information associated with certain temperatures (e.g., the average January day time temperature is 54 degrees and the average January night time temperature is 32 degrees). The temperature information may be determined in Fahrenheit or Celsius.

At 204, at least a subset of the set of relevant business objects is selected by the server based at least in part on the determined temperature information.

In various embodiments, a temperature range attribute is stored for each business object. The value for the temperature range attribute may be submitted by the seller user of the business object. For example, the value for the temperature range attribute can be submitted as part of the set of descriptive information submitted by the seller user. For example, a business object that is a wool coat may be better suited for winter use and therefore could be associated with a temperature range attribute that is associated with lower temperatures. In some embodiments, alternative or in addition to a temperature range attribute, a season attribute is stored for each business object. The value for the season attribute may also be submitted by the seller user of the business object. For example, the value for the season attribute may be selected from one or more of spring, summer, fall, and winter. In some embodiments, the server may maintain a preset temperature range that corresponds to each season. For example, a system administrator user can set the temperature range for each season to be an average temperature range determined based on historical weather records.

The determined temperature information is compared against the temperature related attributes corresponding to the set of relevant business objects and the at least subset of business objects whose temperature related attributes match the determined temperature information are selected. In a first example, a temperature value (or a range of temperature values) included in the determined temperature information is compared against the temperature range attribute of each relevant business object and if the temperature value (or range of temperatrues) falls within (or overlaps) with the temperature range of the business object, then the business object is selected. In another example, the temperature value (or a range of temperature values) is compared against a preset temperature range corresponding to the season attribute corresponding of each relevant business object and if the a temperature value (or range of temperature values) falls within (or overlaps) with the preset temperature range corresponding to the season attribute of the business object, then the business object is selected.

At 205, information associated with the selected at least subset of the set of relevant business objects is sent from the server to the client device. For example, web addresses associated with the selected subset of relevant business objects are included in the information that is sent to the client device. Other data associated with the selected business objects (e.g., attribute information, images) may also be sent to the client device.

At 206, the information associated with the selected at least subset of the set of relevant business objects is displayed at the client device. In some embodiments, the information associated with selected subset of relevant business objects is presented at a user interface at the client device as part of a set of search results.

The following is an example of applying process 200: It is currently January and user Steve lives in California. Steve is looking to purchase a jacket to wear soon and so he uses his computer to send an access request that includes the keyword "jacket" to an e-commerce website. In response to the access request, the website finds a set of relevant business objects that includes jacket A, jacket B, and jacket C. The website determines that user Steve lives in California and determines that the current average day time in California is 55 degrees Faranheit. Jacket A is a goose down parka whose temperature range attribute indicates that the jacket is suited for wear in 10-45 degrees Farenheit weather. Jacket B is a tweed blazer whose temperature range attribute indicates that the jacket is suited for wear in 40-65 degrees Farenheit weather. Jacket C is a light windbreaker whose temperature range attribute indicates that the jacket is suited for wear in 50-70 degrees Farenheit weather. The server compares determined temperature of 55 degrees Faranheit to the temperature ranges corresponding to jacket A, jacket B, and jacket C and determines that the 55 degrees Faranheit temperatures within the temperature ranges of jacket B and jacket C but not jacket A. Therefore, the server only returns jacket B and jacket C among search results for user Steve and omits jacket A. This way, user Steve can view business objects in his search results that are filtered to match the temperature of his location, instead of having to browse through business objects that are not suited for the current weather conditions of his surroundings.

Process 200 can be particularly helpful in selecting to present for users business objects that are suitable for the temperature of the current season and/or weather that the user is experiencing in his or her local area.

Figure 3:
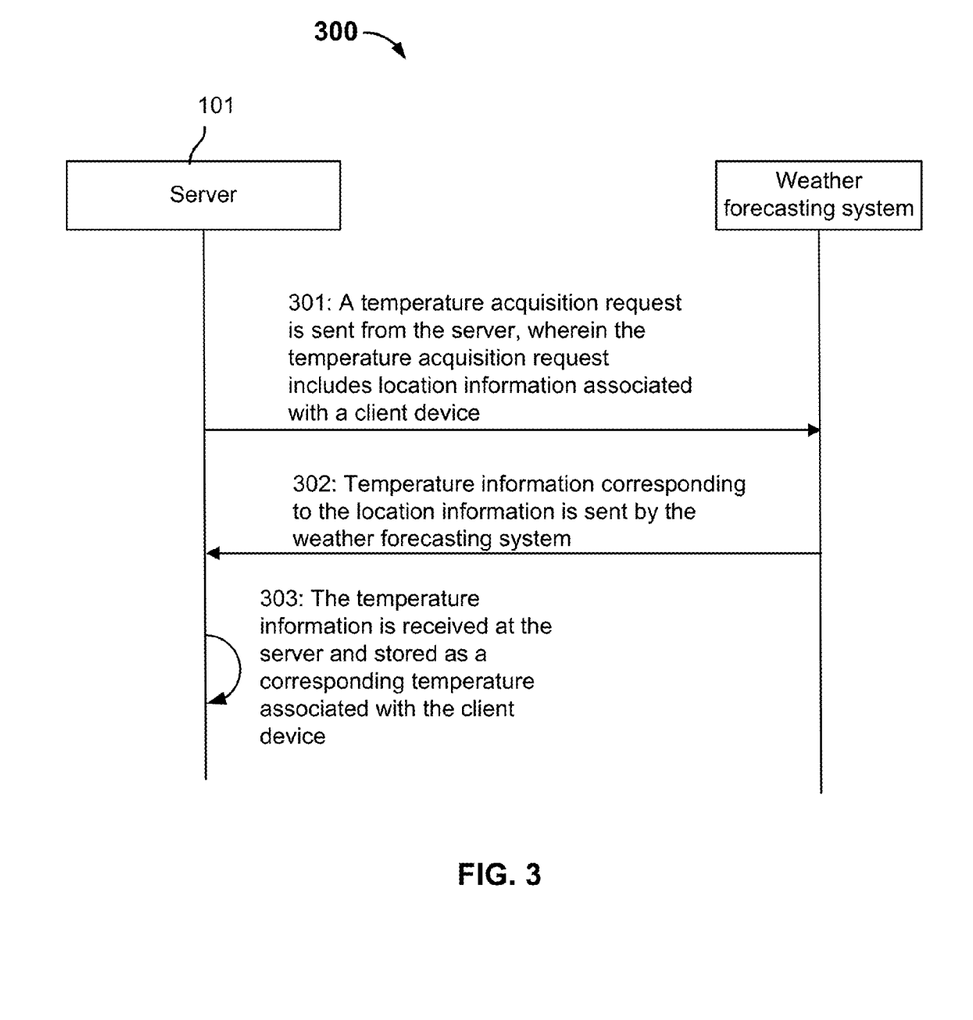
FIG. 3 is a diagram showing an embodiment of a process for determining a temperature associated with a location.

FIG. 3 is a diagram showing an embodiment of a process for determining a temperature associated with a location. In some embodiments, process 300 is implemented at system 100 of FIG. 1. In the example, process 300 is implemented between a server such as server 101 of system 100 of FIG. 1 and a third party server, such as a weather forecasting system. In some embodiments, 203 of process 200 of FIG. 2 is implemented using a process such as process 300.

At 301, a temperature acquisition request is sent from the server to a weather reporting system that provides weather reports and/or forecasts, wherein the temperature acquisition request includes location information associated with a client device. In some embodiments, the location information is determined to be associated with a client device. In some embodiments, the weather forecasting system is operated by a party different than the party that operates the server. In some embodiments, an interface for receiving temperature acquisition requests from the server is first established at the weather forecasting system. In some embodiments, the weather forecasting system may be configured to receive location information of one or more types from the server. Example location information types include: a string associated with a city name, a string associated with a province name, a string associated with a state name, a set of geographic coordinates, and/or a numeric value associated with a zip code. In some embodiments, the weather forecasting system is configured to recognize each of the different types of location information and is able to retrieve corresponding temperature information for each given type of location information. In some embodiments, the corresponding temperature information for a given location information is the most recently recorded or forecasted temperature for that location. The temperature information determined by the weather forecasting system may comprise a single temperature or a range of temperatures. The temperature information determined by the weather forecasting system may be associated with time information.

At 302, temperature information corresponding to the location information is sent by the weather forecasting system.

At 303, the temperature information is received at the server and stored as the correpsonding temperature associated with the client device.

Figure 4:
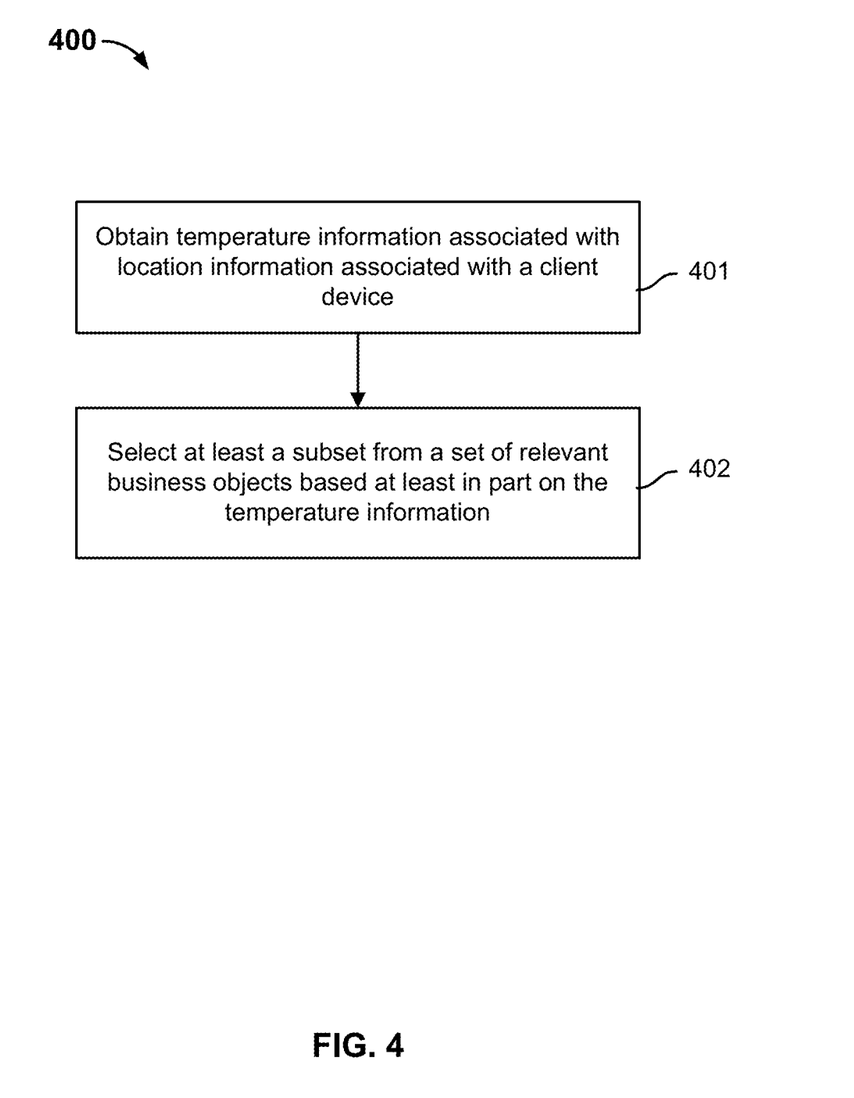
FIG. 4 is a flow diagram showing an embodiment of a process for selecting business objects to return to a client device.

FIG. 4 is a flow diagram showing an embodiment of a process for selecting business objects to return to a client device. In some embodiments, process 400 is implemented at system 100 of FIG. 1. In some embodiments, 204 of process 200 of FIG. 2 is implemented using process 400.

At 401, temperature information associated with location information associated with a client device is obtained. The location of the client device may be determined based on techniques described with process 200 of FIG. 2, for example. The temperature information associated with the location of the client device may be determined based on techniques described in process 300 of FIG. 3, for example.

At 402, at least a subset from a set of relevant business objects based at least in part on the temperature information is selected. A set of relevant business objects may be determined based on techniques described with process 200 of FIG. 2, for example. The corresponding temperature range attributes for the set of relevant business objects may be retrieved and compared against the obtained temperature information associated with the client device. Then those relevant business objects whose temperature range information matched the obtained temperature information associated with the client device are selected. Information associated with selected business objects are then sent back to the client device to be displayed among search results. Information associated with a selected business object may include a web address to a webpage that includes the set of descriptive information associated with the business object. In some embodiments, the information associated with a business object will also include the value of the temperature range attribute stored for the business object so that the applicable temperature range value can be displayed for the user at the client device. By displaying the stored temperature range values of returned business objects, a user can determine which busines objects to select based on his or her needs with respect to the applicable temperature range of each business object. Information associated with non-selected business objects will not be sent to the client device.

In some embodiments, instead of comparing the obtained temperature information associated with a client device against the temperature range attributes of the relevant business objects, the obtained temperature information may be compared against the preset temperature ranges corresponding to other attributes, such as a season attribute or a category attribute. The season attribute has been described above. A category attribute may include values that correspond to different temperature ranges. For examples, if the business objects were associated with apparel, then different category attributes may designate certain business objects to be for cold weather, for snow conditions, for summer weather, for rainy weather, etc. Then a preset temperature range may be set for each such value of the category attribute.

Figure 5:
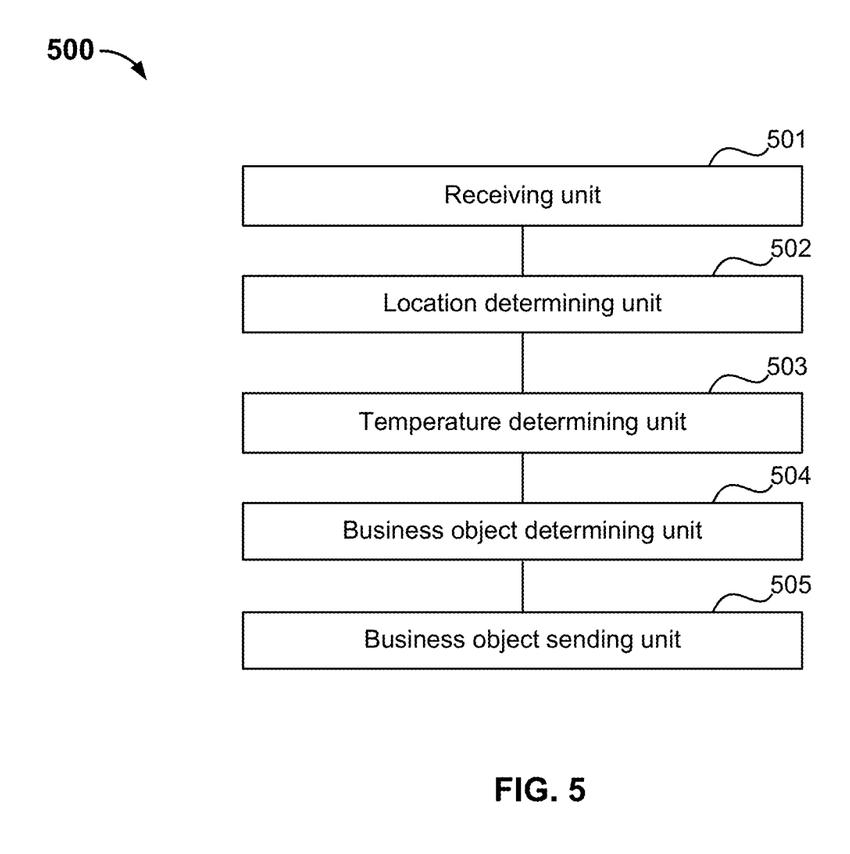
FIG. 5 is a diagram showing an embodiment of a system for determining business objects.

FIG. 5 is a diagram showing an embodiment of a system for determining business objects. In the example, system 500 includes receiving unit 501, location determining unit 502, temperature determining unit 503, business object determining unit 504, and business object sending unit 505. In some embodiments, system 500 is associated with and/or comprises a component of a web server. In some embodiments, the web server is associated with supporting an e-commerce website.

The units can be implemented as software components executing on one or more processors, as hardware such as programmable logic devices and/or Application Specific Integrated Circuits designed to perform certain functions, or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices.

Receiving unit 501 is is configured to receive an access request sent by a client device. In some embodiments, receiving unit 501 is configured to determine a set of business objects that are relevant to the access request.

Location determining unit 502 is configured to determine the location information associated with the client device that sent the access request received by receiving unit 501.

Temperature determining unit 503 is configured to determine the temperature information of the location determined by location determining unit 502.

Business object determining unit 504 is configured to select, from among the set of relevant business objects determined based on information included in the access request, at least a subset of business objects whose associated temperature related attributes correspond to the temperature information determined by temperature determining unit 503. For example, a business object associated with a temperature range in which the current temperature associated with the location of the client device is included is selected.

Business object sending unit 505 is configured to send information associated with the business objects selected by business object determining unit 504 to the client device for display.

In some embodiments, location determining unit 502 is configured to use the Internet Protocol (IP) address included in the access request sent by the client device as a basis for determining the location corresponding to the client device.

In some embodiments, location determining unit 502 is alternatively or additionally configured to use a previously stored shipping address associated with a user associated with the access request as a basis for determining the location information of the client device.

In some embodiments, temperature determining unit 503 is configured to send a temperature acquisition request with the location information of the client device to a third party server (e.g., a weather forecasting system) and receive temperature information for the location that was determined by the third party server based on the location information included in the communication.

In some embodiments, business object determining unit 504 is configured to use the stored temperature range attribute corresponding to each business object as a basis for selecting, from the set of relevant business objects, the business objects whose applicable temperature range includes a temperature or a range of temperatures that is included in temperature information determined by temperature determining unit 503.

In some embodiments, business object determining unit 504 is configured to determine the temperature range value corresponding to each business object's stored temperature related attribute.

The units described in system may be realized through computer programs. Persons skilled in the art should be able to understand that the unit partition pattern described above is but one of a great number of unit partition patterns. The system for determining business objects shall fall within the protective scope of the present application so long as it has at least the functions described above, even if it is partitioned into different, fewer, or additional units or is not partitioned into any units.

A person skilled in the art should understand that the embodiments of the present application can be provided as methods, devices (equipment), or computer software products. Therefore, the present application can take the form of embodiments consisting entirely of hardware, embodiments consisting entirely of software, and embodiments which combine both software and hardware. In addition, the present application can take the form of computer program products implemented on one or more computer-operable storage media (including but not limited to magnetic disk storage devices, CD-ROMs, and optical storage devices) containing computer operable program codes.

The present application is described with reference to flow charts and/or block diagrams based on methods, devices (equipment) and computer program products in the embodiments of the present application. It should be understood that each process and/or block in the flow charts and/or block diagrams, and combinations of processes and/or blocks in the flow charts and/or block diagrams, can be achieved through computer program commands. One can provide these computer commands to a general-purpose computer, a specialized computer, an embedded processor or the processor of other programmable data processing equipment so as to give rise to a machine, with the result that the commands executed through the computer or processor of other programmable data processing equipment give rise to a device that is used to realize the functions designated by one or more processes in a flow chart and/or one or more blocks in a block diagram.

These computer program commands can also be stored on computer-readable storage devices that can guide computers or other programmable data processing equipment to work in a particular way, with the result that the commands stored on these computer-readable devices give rise to products that include command devices. These command devices realize the functions designated in one or more processes in a flow chart and/or one or more blocks in a block diagram.

These computer program commands can also be loaded onto a computer or other programmable data processing equipment, with the result that a series of operating steps are executed on a computer or other programmable equipment so as to give rise to computer processing. In this way, the commands executed on a computer or other programmable equipment provide steps for realizing the functions designated by one or more processes in a flow chart and/or one or more blocks in a block diagram.

Although preferred embodiments of the present application have already been described, a person skilled in the art can make other modifications or revisions to these embodiments once he grasps the basic creative concept. Therefore, the attached claims are to be interpreted as including the preferred embodiments as well as all modifications and revisions falling within the scope of the present application. Obviously, a person skilled in the art can modify and vary the present application without departing from the spirit and scope of the present invention. Thus, if these modifications to and variations of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system to determine business objects, comprising:
one or more processors configured to:
  receive an access request from a client device;
  determine a set of relevant business objects based at least in part on information included in the access request, wherein the set of relevant business objects is associated with a corresponding set of season attributes;
  determine a location associated with the client device;
  determine temperature information associated with the location, wherein to determine the temperature information associated with the location comprises to send a temperature acquisition request to a temperature acquisition interface established at a weather forecasting system, wherein the temperature acquisition request includes the location associated with the client device;
  select at least a subset of business objects from the set of relevant business objects based at least in part on the temperature information, wherein to select the at least a subset of business objects includes to:
    determine stored preset temperature information corresponding to the set of season attributes associated with the set of relevant business objects;
    compare the temperature information associated with the location to the stored preset temperature information corresponding to the set of season attributes associated with the set of relevant business objects; and
    select a business object from the set of relevant business objects in the event that the temperature information associated with the location corresponds to a portion of the stored preset temperature information corresponding to a season attribute associated with the business object; and
  send information associated with the selected at least a subset of business objects to the client device, wherein the information associated with the selected at least a subset of business objects is caused to be presented at the client device; and one or more memories coupled to the one or more processors and configured to provide instructions for the one or more processors.

2. The system of claim 1, wherein the information included in the access request includes one or more keywords.

3. The system of claim 1, wherein determining the location associated with the client device includes using an Internet Protocol (IP) address included in the access request.

4. The system of claim 1, wherein determining the location associated with the client device includes using user input location information.

5. The system of claim 1, wherein determining the location associated with the client device includes using previously stored shipping information associated with a user associated with the access request.

6. The system of claim 1, wherein determining the temperature information associated with the location includes receiving temperature information.

7. The system of claim 1, wherein the portion of the stored preset temperature information corresponding to the season attribute associated with the business object comprises a temperature range and wherein the temperature information associated with the location corresponds to the temperature range in the event that a temperature included in the temperature information associated with the location falls within a range of values of the temperature range.

8. The system of claim 1, wherein to determine the location associated with the client device comprises to:
   determine an Internet Protocol (IP) address associated with the client device, wherein the IP address associated with the client device is included in the access request;
   determine that the IP address associated with the client device corresponds to a matching IP address range from a database of IP addresses and corrresponding locations; and
   determine that a location corresponding to the matching IP address range from the database is the location associated with the client device.

9. A method for determining business objects, comprising:
   receiving, using one or more processors, an access request from a client device;
   determining a set of relevant business objects based at least in part on information included in the access request, wherein the set of relevant business objects is associated with a corresponding set of season attributes;
   determining a location associated with the client device;
   determining temperature information associated with the location, wherein determining the temperature information associated with the location comprises sending, using the one or more processors, a temperature acquisition request to a temperature acquisition interface established at a weather forecasting system, wherein the temperature acquisition request includes the location associated with the client device;
   selecting at least a subset of business objects from the set of relevant business objects based at least in part on the temperature information, wherein selecting the at least a subset of business objects includes:
      determining stored preset temperature information corresponding to the set of season attributes associated with the set of relevant business objects;
      comparing the temperature information associated with the location to the stored preset temperature information corresponding to the set of season attributes associated with the set of relevant business objects; and
      selecting a business object from the set of relevant business objects in the event that the temperature information associated with the location corresponds to a portion of the stored preset temperature information corresponding to a season attribute associated with the business object; and
   sending information associated with the selected at least a subset of business objects to the client device, wherein the information associated with the selected at least a subset of business objects is caused to be presented at the client device.

10. The method of claim 9, wherein determining the location associated with the client device includes using an Internet Protocol (IP) address included in the access request.

11. The method of claim 9, wherein determining the location associated with the client device includes using user input location information.

12. The method of claim 9, wherein determining the location associated with the client device includes using previously stored shipping information associated with a user associated with the access request.

13. The method of claim 9, wherein determining the temperature information associated with the location includes receiving temperature information.

14. The method of claim 9, wherein the portion of the stored preset temperature information corresponding to the season attribute comprises a temperature range associated with the business object and wherein the temperature information associated with the location corresponds to the temperature range in the event that a temperature included in the temperature information associated with the location falls within a range of values of the temperature range.

15. The method of claim 9, wherein determining the location associated with the client device comprises:
   determining an Internet Protocol (IP) address associated with the client device, wherein the IP address associated with the client device is included in the access request;
   determining that the IP address associated with the client device corresponds to a matching IP address range from a database of IP addresses and corrresponding locations; and
   determining that a location corresponding to the matching IP address range from the database is the location associated with the client device.

16. A computer program product for determining business objects, the computer program product being embodied in a non-transitory computer readable storage medium and comprising computer instructions for:
   receiving an access request from a client device;
   determining a set of relevant business objects based at least in part on information included in the access request, wherein the set of relevant business objects is associated with a corresponding set of season attributes;
   determining a location associated with the client device;
   determining temperature information associated with the location, wherein determining the temperature information associated with the location comprises sending, using one or more processors, a temperature acquisition request to a temperature acquisition interface established at a weather forecasting system, wherein the temperature acquisition request includes the location associated with the client device;

selecting at least a subset of business objects from the set of relevant business objects based at least in part on the temperature information, wherein selecting the at least a subset of business objects includes:

determining stored preset temperature information corresponding to the set of season attributes associated with the set of relevant business objects;

comparing the temperature information associated with the location to the stored preset temperature information corresponding to the set of season attributes associated with the set of relevant business objects; and selecting a business object from the set of relevant business objects in the event that the temperature information associated with the location corresponds to a portion of the stored preset temperature information corresponding to a season attribute associated with the business object; and sending information associated with the selected at least a subset of business objects to the client device, wherein the information associated with the selected at least a subset of business objects is caused to be presented at the client device.

17. The computer program product of claim 16, wherein determining the location associated with the client device comprises:

determining an Internet Protocol (IP) address associated with the client device, wherein the IP address associated with the client device is included in the access request;

determining that the IP address associated with the client device corresponds to a matching IP address range from a database of IP addresses and corrresponding locations; and determining that a location corresponding to the matching IP address range from the database is the location associated with the client device.

* * * * *

UNITED STATES PATENT AND TRADEMARK OFFICE
CERTIFICATE OF CORRECTION

| | |
|---|---|
| PATENT NO. | : 9,633,387 B2 |
| APPLICATION NO. | : 13/865663 |
| DATED | : April 25, 2017 |
| INVENTOR(S) | : Huaibin Yuan |

It is certified that error appears in the above-identified patent and that said Letters Patent is hereby corrected as shown below:

In the Specification

Column 7, Line 60 after "determine which" delete "busines" and insert --business--, therefor.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*